Aug. 24, 1948.   H. J. CARLIN ET AL   2,447,634
MOTOR OPERATED TAP CHANGER
Filed April 14, 1944                2 Sheets-Sheet 1

WITNESSES:
E. A. McCloskey
Nw. C. Groove

INVENTORS
Herbert J. Carlin and
James F. Chapman.
BY
Franklin E. Hardy
ATTORNEY

Aug. 24, 1948. H. J. CARLIN ET AL 2,447,634
MOTOR OPERATED TAP CHANGER
Filed April 14, 1944 2 Sheets-Sheet 2

WITNESSES:
E. A. McCloskey
Wm. C. Groome

INVENTORS
Herbert J. Carlin and
James F. Chapman.
BY
Franklin E. Hardy
ATTORNEY

Patented Aug. 24, 1948

2,447,634

UNITED STATES PATENT OFFICE 2,447,634

MOTOR OPERATED TAP CHANGER

Herbert J. Carlin, East Orange, and James F. Chapman, Madison, N. J., assignors to Westinghouse Electric Corporation, East Pittsburgh, Pa., a corporation of Pennsylvania Application April 14, 1944, Serial No. 530,998

9 Claims. (Cl. 323—55)

The invention relates to regulator systems, and is illustrated as applied to electrical apparatus for regulating the voltage of a distribution circuit.

In electrical distribution systems for supplying electric energy to various load devices, automatically operated electrical regulators, such as tap-changing transformers, are frequently employed for maintaining a desired voltage on the supply circuit delivering power to the load. The operation of such electrical apparatus is controlled by a primary relay responsive to the regulated voltage and which is effective to initiate the operation of a motor operated tap-changing mechanism for raising and lowering the voltage of the supply circuit as this voltage drops below or rises above a desired value.

When a tap-changing operation has been initiated by operation of the primary relay, the tap-changing mechanism is operated through a step in the operation of the mechanism changing the output voltage a predetermined amount corresponding to that effected by changing the point of connection from one tap connection to the next in a series of tap connections. The voltage change on the regulated circuit may not be effected rapidly enough to cause the primary relay contacts to interrupt the operation of the tap-changing mechanism at the end of a tap-changing step, but may continue the operation through a second step before the effect of the previously completed step of operation of the mechanism has been felt on the primary relay operating winding. Thus a false step of operation is initiated. This over-regulation of the circuit results in another operation of the regulator in the opposite direction to correct the circuit condition and, if the regulator continues to over-regulate in both directions, will cause the regulator to operate back and forth between adjacent tap positions of the regulator, thus causing unnecessary wear and tear on the regulating apparatus.

One way of preventing this repeated hunting operation of the regulator is to stop the tap-changing mechanism for an appreciable time at the end of each tap-changing operation, so that sufficient time will elapse for the winding of the primary relay to respond to the voltage change on the system resulting from the tap-changing operation before a further tap-changing operation occurs. It is, however, undesirable to do this if the condition of the regulated circuit requires operation of the regulator through several tap-changing steps in order to effect a correction in the regulated quantity of the circuit to its desired value.

In accordance with the invention, means is provided for impressing voltage upon the primary relay control coil that is a measure of the voltage of the circuit being regulated and for introducing an additional voltage in the circuit of the primary relay control coil for a limited interval of time during the operation of the regulating mechanism to bias the primary relay in a direction to separate its contacts during the tap-changing operation. Upon the completion of the operation of the mechanism from one tap position to another, this additional component of voltage is eliminated from the circuit, causing the primary relay to immediately become again responsive to the regulated voltage. If the condition to be regulated requires further operation of the regulator in the same direction, the primary relay will again close its contacts and effect such operation. If the voltage change required is large, requiring several tap-changing steps in the operation of the regulator, this bias may not be sufficient to separate the relay contacts during every step of operation of the regulator, because the force tending to keep the contacts closed will also be large, but the contacts will be separated soon enough to prevent overtravel in the operation of the regulator.

It is an object of the invention to provide a regulator system of the above-indicated character that is provided with means for preventing overtravel of the regulating apparatus.

More specifically stated, it is an object of the invention to introduce an anti-hunting action into the operation of the primary relay initiating the operation of the regulating apparatus during the operation of the regulating mechanism, and to remove the anti-hunting action immediately upon completion of a step of operation of the regulator to again permit immediate control of the regulator by the primary relay, in accordance with the conditions of the circuit being regulated.

Other objects and advantages of the invention will become apparent from the following description of a preferred embodiment thereof, reference being had to the accompanying drawings, in which.

Figure 1:
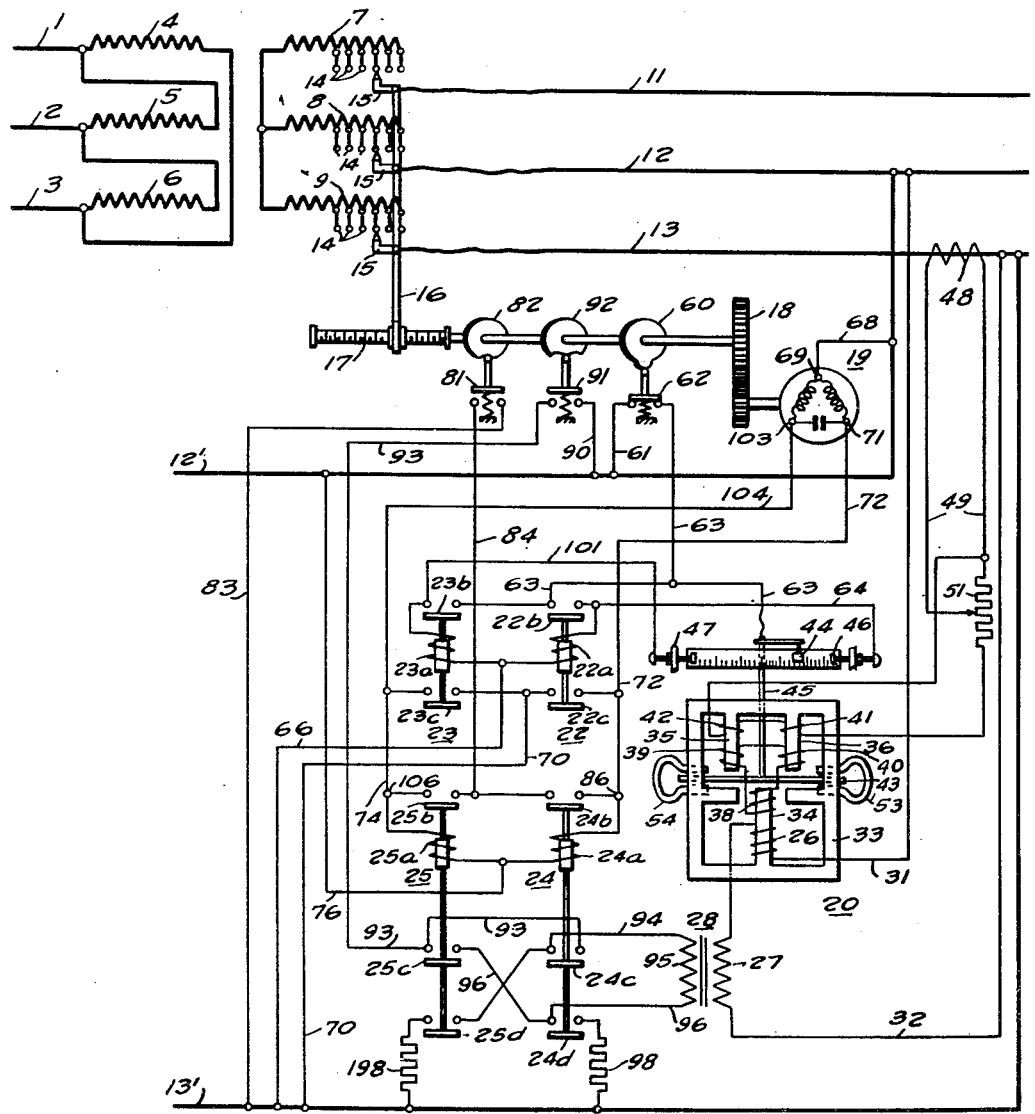
Figure 1 is a diagrammatic view of apparatus and circuits illustrating one preferred embodiment of the invention.
Figure 2:
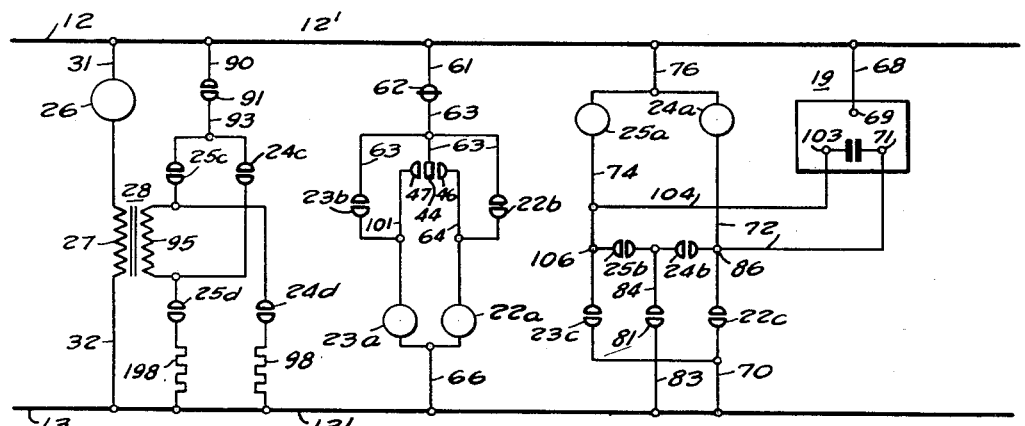
Fig. 2 is a simplified diagram of the control circuits shown in Fig. 1.

Referring to the drawings, conductors 1, 2 and 3 represent a three-phase alternating-current power circuit connected to primary transformer windings 4, 5 and 6 that are inductively related, respectively, to windings 7, 8 and 9, through which energy is supplied to the three-phase circuit represented by conductors 11, 12 and 13. A tap-changing mechanism is provided for varying the voltage ratio between the primary circuit conductors 1, 2 and 3 and the secondary circuit conductors 11, 12 and 13 which is diagrammatically illustrated as comprising a plurality of tap-changing switch contact members 14 connected to the tap points in the secondary windings 7, 8 and 9, and cooperating with movable switch contact members 15 in each of the three phases that are similarly operated by a mechanism diagrammatically illustrated as an arm 16 controlled by a screw-threaded shaft 17 that is operated through suitable gearing mechanism 18 by motor 19.

Control means for the tap-changing mechanism is provided comprising a circuit controller or primary relay 20 which is effective to control the operation of the secondary relays 22 and 23 to cause operation of the motor 19 in the one or in the other direction. The auxiliary relays 24 and 25 are controlled upon the operation of the motor 19 to introduce an anti-hunting action into the operation of the primary relay 20.

The relay 20 is provided with an operating winding 26 that is connected in series with the winding 27 of a reactance device 28 that is connected by conductors 31 and 32 to be energized in accordance with the voltage across the conductors 12 and 13. A potential transformer may be provided for energizing this circuit from the circuit conductors 12 and 13 if desired.

The relay 20 is shown as of the induction type, and comprises a magnetizable core structure having an outer ring 33, an upwardly projecting center leg 34 and two downwardly extending spaced legs 35 and 36. The main operating winding 26 and also the winding 38 is provided on the leg 34, the winding 38 being connected in series circuit relation with windings 39 and 40 carried on the legs 35 and 36, respectively. Auxiliary compensating windings 41 and 42 are also carried on the legs 35 and 36, respectively, and are connected in series circuit relation with each other and energized in accordance with the load on the circuit as determined by the current transformer 48 connected to the windings 41 and 42 by circuit conductors 49. An adjustable resistor 51 is included in this circuit for adjusting the degree of line drop compensation desired.

As illustrated, a movable disc 43 of copper or other suitable conducting material is rotatably mounted between the ends of the pole pieces or projecting legs of the magnetic circuit, the disc being disposed to be moved in the one or the other direction depending upon the energization of the windings of the relay. When the disc 43 is moved, a contact member 44 carried at the upper end of the shaft 45 is actuated to engage the one or the other of the stationary contact members 46 or 47, to control the operation of the secondary relays 22 or 23, depending upon the direction of movement of the contact member 44.

As is usual practice, a spring (not shown) is provided for biasing the shaft 45 at a direction to bias the contact member 44 toward or into engagement with the contact member 46. The spring is so adjusted that it will establish the value of the regulated quantity to which the relay 20 is responsive. Permanent magnets 53 and 54 are shown positioned to retard the movement of the copper disc 43, so as to provide a time-delay operation of the relay 20 that varies inversely as the change in the voltage applied to the relay energizing circuit comprising conductors 31 and 32, as the disc 43 is moved in response to the difference between the force of the spring and that induced by the relay windings.

The primary relay 20 may correspond to that disclosed in Patent No. 2,313,921, issued March 16, 1943, to H. J. Carlin and L. N. Crichton for Regulator control equipment, assigned to the same assignee as this invention.

The supply conductors 12' and 13' are connected to be energized from conductors 12 and 13, to provide a supply of energy for operating the motor 19 and the relays 22, 23, 24, and 25. If the regulated voltage drops below its desired value, the relay 20 will operate to bring the contact member 44 into engagement with the contact member 46, the time of this operation depending upon the amount of change in the regulated quantity from its desired value. Upon engagement of contact members 44 and 46, a circuit is closed from the supply conductor 12' through conductor 61, cam switch 62, which is in its circuit closing position when the tap-changing mechanism is at a tap position, through conductor 63, contact members 44 and 46, conductor 64, the operating coil 22a of the secondary relay 22, and the conductor 66 to the supply conductor 13', thus energizing the secondary relay 22 for operating it to a position to close relay contacts 22b and 22c and cause operation of the motor 19 in a direction to raise the voltage supplied to conductors 11, 12 and 13.

Upon the operation of the relay 22 to its circuit closing position, a circuit to energize the motor 19 is closed from the supply conductor 12' through conductor 68 to the motor terminal 69, from the motor terminal 71 through conductor 72, relay contact member 22c of the relay 22, and conductor 70 to the supply conductor 13', causing the motor to operate in a direction to raise the regulated voltage. A "holding" circuit for the relay 22 is completed from the supply conductor 12' through conductor 61, the cam switch 62, conductor 63, contact member 22b on relay 22, through relay winding 22a and conductor 66, to supply conductor 13'. If, after the relay 22 has been operated to its circuit closing position, the voltage of the circuit 11, 12, and 13 should be restored so that the primary relay 20 operates to separate its contacts 44 and 46, the above traced "holding" circuit will hold the relay 22 closed to continue the operation of the motor.

A circuit is also closed from supply conductor 13' through conductor 70, relay contact member 22c, conductor 72, the winding 24a of relay 24, through conductor 76 to supply conductor 12', thus causing the relay 24 to operate to its circuit closing position. This operation of the relay 24 closes contacts 24b, 24c, and 24d. The contact 24b closes one point in a circuit that is completed upon the closing of the cam switch 81, and the contacts 24c and 24d close points in a circuit that is completed upon the closing of the cam switch 91.

When the relay 22 is closed, as above described, the motor 19 is energized to operate the tap-changing contact members 15 from engagement with one set of tap-changing switch contact members 14 to an adjacent one of the series of contact members 14. Upon movement of the motor 19 and the shaft 17, the cams 82, 92, and 60 start to move. After a short time interval, the cam 82 moves the switch 81 to its circuit closing position and causes it to remain closed until the shaft 17 has made substantially one revolution corresponding to movement of the tap-changing mechanism from one tap-changing position to the next. Thus during a tap-changing operation a circuit is closed from the supply circuit conductor 12' through conductor 83, cam switch 81, conductor 84, contact member 24b of the relay 24 to a junction point 86, and from this junction point through two branch circuits, one leading through the winding 24a of the relay 24 as previously traced to the supply circuit conductor 12', and the other leading through conductor 72, motor terminals 71 and 69, and conductor 68 to supply conductor 12', to maintain the operation of the motor until the completion of a step of operation of the tap-changing mechanism.

The cam switch 81 and the relay 24 close prior to the opening of the cam switch 62 so that the motor circuit through the contact 24b of relay 25 is established prior to interruption of the above traced "holding" circuit through the cam switch 62 and contact 22b of the relay 22, which "holding" circuit energizes the winding 22a that holds the contact 22c closed.

The cam switch 91 likewise is operated to a circuit closing position by the cam 92 as the motor 19 moves from a tap position during a tap-changing operation. The cam switch 91 would ordinarily be designed to close after the cam switch 81 has closed and established the "holding" circuit. A circuit is thereby closed from supply conductor 12', through conductor 90, cam switch 91, conductor 93, contact member 24c of the relay 24, conductor 94 through a winding 95 of the reactance device 28 that is inductively related to the winding 27, through conductor 96, contact member 24d and resistor 98, to supply conductor 13', thus introducing into the winding 27 a voltage for modifying the energization of the primary relay operating winding 26 to increase the energization of the relay and cause separation of the contact members 44 and 46. This insures that, unless a large change in voltage is called for requiring several tap-changing steps, when the tap-changing operation of one step has been completed, the contact members 44 and 46 will be separated and the relay 20 will not cause further operation of the tap-changing mechanism until sufficient time has passed for the effect of the tap-changing operation to be felt on the winding 26 to cause further operation of the relay in response to the voltage across conductors 12 and 13. The cam switch 91 opens, upon or slightly before the completion of a tap-changing operation, thus interrupting the circuit through the contact members 24c and 24d of the relay 24 to the winding 95 of the reactance device 28 so that the relay 20 will again be responsive to the voltage of the circuit being regulated when the tap-changing operation is completed. Upon completion of the tap-changing operation, the cam switch 81 is also opened, thus interrupting the motor energizing circuit through the contact member 24b and the motor terminals 71 and 69 to stop the motor 19. The opening of the cam switch 81 also deenergizes the winding 24a of the relay 24, thus permitting this relay to drop to its open circuit position.

If the conditions of the regulated circuit require further operation of the regulating mechanism, this will be effected by a further operation of the relay 20, to again bring the contact members 44 and 46 again into engagement, effecting a further operation of the tap-changing mechanism in the manner just described.

If the regulated voltage rises above its desired value, the relay 20 will operate to bring the contact member 44 into engagement with the contact member 47 after a time interval depending upon the amount of departure of the regulated quantity from its desired value. Upon engagement of the relay contact members 44 and 47, a circuit is closed from the supply conductor 12' through conductor 81, cam switch 62, contact members 44 and 47, conductor 101, the operating coil 23a of the relay 23, and conductor 66 to the supply conductor 13' thus energizing the secondary relay 23 and operating it to its circuit closing position.

Upon the operation of the relay 23 to its circuit closing position, a circuit is closed to operate the motor 19 in a direction to lower the voltage supplied to the conductors 11, 12, and 13. This circuit extends from the supply conductor 12' through conductor 68 to the motor terminal 69 and from the motor terminal 103 through conductor 104, relay contact member 23c of the relay 23, and conductor 70 to the supply conductor 13'. A holding circuit for the relay 23 is completed from the supply conductor 12' through conductor 61, the cam switch 62, conductor 68, the contact member 23b on relay 23, through the relay winding 23a and conductor 66 to the supply conductor 13'. If after the relay 23 has been operated to its circuit closing position, the voltage of the circuit represented by conductors 11, 12, and 13 should be restored to its desired value so that the primary relay 20 operates to separate its contact members 44 and 47, the above traced "holding" circuit will hold the relay 23 in its closed position to continue the operation of the motor 19. This operating feature is provided in order to prevent the motor from stopping except when the tap-changing mechanism is in one of its tap-changing positions connecting the switch contact members 15 with one or the other of the plurality of contact members 14.

Upon the closing of the relay 23, a circuit is also closed from the supply conductor 13' through conductor 70, relay contact member 23c, conductor 74, the winding 25a of relay 25 through conductor 76 to supply conductor 12', thus causing the relay 25 to operate to its circuit closing position. This operation of the relay 25 closes contacts 25b, 25c, and 25d. The contact 25b closes one point in a circuit that is completed upon the closing of the cam switch 81 and the contacts 25c and 25d close points in a circuit that is completed upon the closing of the cam switch 91.

When the relay 23 is closed as above described, the motor 19 is energized to operate the tap-changing contact members 15 from engagement with one set of tap-changing switch contact members 14 to an adjacent one of the series of contact members 14. Upon movement of the motor 19 and the shaft 17, the cams 82, 92, and 60 also move. After a short time interval, the cam 92 closes the switch 91 and causes it to remain closed until the shaft 17 has made substantially one revolution corresponding to movement of the tap-changing mechanism from one tap-changing position to the next. A circuit is closed from the supply circuit conductor 13' through conductor 83, cam switch 81, conductor 84, contact member 25b of the relay 25, to a junction point 106, and from this junction point through two branch circuits. One of these two circuits leads through the winding 25a of the relay 25 as previously traced to the supply circuit conductor 12', and the other leads through conductor 104, motor terminals 103 and 69, and conductor 68 to supply conductor 12' to maintain the operation of the motor until the completion of a step of operation of the tap-changing mechanism.

The cam switch 81 closes before the cam switch 62 opens so that the motor circuit through the contact 25b of the relay 25 is established prior to the interruption of the "holding" circuit through the cam switch 62 and the contact 23b of the relay 23, through which circuit the winding 23a is energized to hold the relay 23 closed. The cam switch 91 is likewise operated to a circuit closing position by the cam 92 as the motor 19 moves from a tap-changing position during the tap-changing operation. A circuit is closed by the cam switch 91 extending from the supply conductor 12', through the cam switch 91, conductor 93, contact member 25c of the relay 25, conductor 96, through the winding 95 of the reactance device 28, conductor 94, contact member 25d and resistor 198 to supply conductor 13', thus introducing into the winding 27 a voltage for modifying the energization of the primary relay operating winding 26 to decrease the energization of the relay and cause separation of the contact members 44 and 47. This insures that when the tap-changing operation has been completed, the contact members 44 and 47 will be separated and the relay 20 will not cause further operation of the tap-changing mechanism until sufficient time has passed for the effect of the tap-changing operation to be felt on the winding 26 so that further operation of the tap-changing mechanism will be in response to the voltage across the conductors 12 and 13 as impressed upon the relay winding 26.

Upon completion of the tap-changing operation, the cam switch 81 is opened, interrupting the motor energizing circuit through the contact member 25b and the motor terminals 103 and 69 to interrupt the operation of the motor 19. The opening of the cam switch 81 also deenergizes the winding 25a of the relay 25, thus permitting this relay to drop to its open circuit position. The cam switch 91 is likewise opened as the tap-changing mechanism approaches a tap position interrupting the circuit through the contact members 25c and 25d of the relay 25, and the winding 95 of the reactance device 28.

If the conditions of the regulated circuit require further operation of the regulating mechanism in the same direction, this will be effected by a further operation of the relay 20 to again bring the contact members 44 and 47 into engagement, effecting a similar operation of the mechanism from one tap position to the next.

Figure 3A:
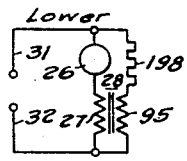
Figs. 3A and 3B are diagrammatic simplifications of the anti-hunting circuit.
Figure 3B:
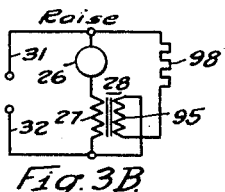
Figure 3:
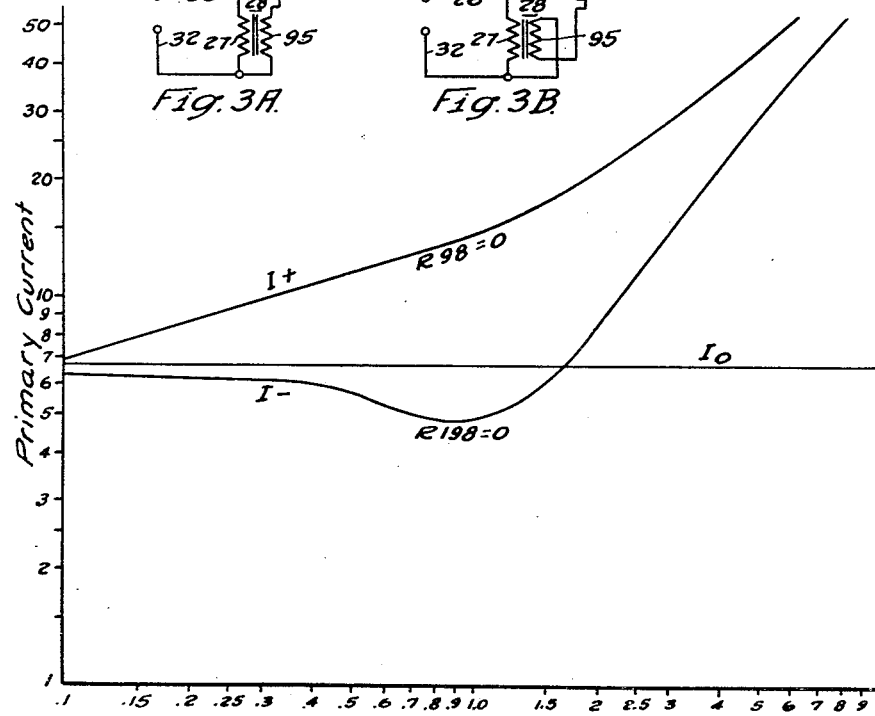
Fig. 3 shows curves illustrating calculated variations in primary relay current under certain conditions of the circuit.

Referring to Fig. 3, the curves I+ and I— indicate the current that will flow through the relay winding 26 as a result of the operation of the reactor device 28 when the one or the other of the relays 24 or 25 is closed. The curve $I_0$ represents the current when the secondary, that is, the circuit of the winding 95, is open so that there is no induced current from the winding 95 to the winding 27. The current values represented in curves I+ and I— are calculated values based upon the assumption that the resistors 98 and 198, respectively, have a value equal to zero. By varying the value of these resistor elements, the magnitude of the current values I+ and I— may be varied and, therefore, the voltage that is induced from the winding 95 to the winding 27 may be controlled as required. In the curve, the turn ratio between windings 27 and 95 is plotted against the primary current in the relay circuit. It will be noted that for a turn ratio of unity, both curves are a substantial distance from the curve represented by the horizontal line $I_0$, at which value a substantial "boost" or "buck" voltage may be introduced into the circuit of the relay winding 26 through the reactor device 28. It will be noted that as the turn ratio between the windings 27 and 95 increases, both curves I+ and I— rise above the curve $I_0$.

It will be obvious to those skilled in the art that modifications in the apparatus and circuits illustrated and described may be made within the spirit of the invention, and we do not wish to be liimted otherwise than by the scope of the appended claims.

We claim as our invention:

1. In combination, apparatus for controlling an electrical quantity to be regulated, regulating means for regulating said electrical quantity in a series of predetermined regulating steps, control equipment for said regulating means including an induction type circuit controlling relay having a movable disc of conducting material, a magnetic circuit having pole pieces adjacent to the disc for controlling the operation of the disc, and means for energizing the magnetic circuit responsive to the value of said electrical quantity for initiating the operation of said regulating means, and switch controlled reactor means responsive to and effective during the operation of said regulating means through a regulating step for biasing said circuit controlling relay in a direction to oppose continued operation of the regulating means upon the completion of the operation of the regulator through a regulating step.

2. In combination, apparatus for controlling an electrical quantity to be regulated, regulating means for regulating said electrical quantity in a series of predetermined regulating steps, control equipment including an electric motor and mechanism operated thereby for operating said regulating means including an induction type circuit controlling relay having a movable disc of conducting material, a magnetic circuit having pole pieces adjacent to the disc for controlling the operation of the disc and permanent magnets having pole pieces adjacent the disc for introducing a time delay into the operation of the relay, and means for energizing the magnetic circuit responsive to the value of said electrical quantity to be regulated for initiating the operation of said regulating means, and circuit controlling switch means responsive to the energization of the electric motor for operation in the one or the other direction for biasing said circuit controlling relay in a direction to oppose continued operation of the regulating means in the same direction upon the completion of the operation thereof through a regulating step.

3. In a step type regulator, a circuit controller responsive to variations from normal value of an electrical quantity to be regulated, control means controlled by said controller for initiating a correction in the electrical quantity, and means responsive to the initiation of the correction in the electrical quantity for biasing the controller in a direction to cause an interruption in the operation of the regulator upon a completion of an operating step and to promptly interrupt the means for biasing the controller upon the completion of an operating step of the regulator to thereby promptly condition the circuit controller for initiating further operation of the regulator in response to variations in the electrical quantity from normal.

4. In combination, apparatus for controlling an electrical quantity to be regulated, regulating means including motor operated mechanism for regulating said electrical quantity from one to another of a plurality of predetermined operating steps, control means for said regulating means including a contact making primary relay responsive to the value of the electrical quantity to be regulated and additional means including control circuits and contact members controlled by the primary relay for initiating the operation of said motor operated mechanism in the one or in the other direction, switch controlled reactor means responsive to the operation of the motor operated mechanism for biasing the operation of the primary relay to separate the contact members that initiate the operation of the regulator, and cam operated switch means for interrupting the operation of said last-named means upon the completion of the operation of the motor operated mechanism through an operating step of the regulator.

5. In a step type regulator, a circuit controller responsive to variations in an electrical quantity to be regulated from a desired value, a motor operated mechanism for varying the position of said regulator, control means for controlling the operation of said motor operated mechanism in the one or in the other direction including a contact making primary relay responsive to the value of the electrical quantity to be regulated, said primary relay including an operating winding connected in a circuit energized in accordance with the regulated electrical quantity, a reactance device having a winding connected in said circuit, a circuit responsive upon the operation of said motor operated mechanism for introducing a component of voltage across said reactance device in a direction to bias the operation of the primary relay against initiating another step of regulation in the same direction, and for interrupting said circuit to remove said bias in the operation of the primary relay upon completion of the operation of the regulator through a regulating step.

6. In combination, apparatus for controlling an electrical quantity to be regulated, a motor operated regulating means for regulating said electrical quantity in steps, a circuit controller responsive to variations in the value of the electrical quantity to be regulated from a desired value for initiating the operation of said regulating means, said circuit controller including a primary relay including an operating winding connected in a circuit energized in accordance with the electrical quantity to be regulated, a reactance device having a winding connected in said circuit, an anti-hunting circuit for introducing a component of voltage across said reactance device for biasing the operation of the primary relay, and circuit control means operative upon the operation of said motor operated regulator means for so closing said anti-hunting circuit as to bias the operation of the primary relay against initiating another step of regulation in the same direction, and for interrupting said anti-hunting circuit upon completion of the operation of the regulator through a regulating step.

7. In a regulator arranged to operate in a series of predetermined operating steps, regulator operating means for operating said regulator, a primary relay responsive to variations from normal of a condition to be regulated for initiating the operation of said regulator operating means for operating said regulator in the one or in the other direction, mechanically operable switching means effective upon the initiation of the operation of the regulator in the one or in the other direction from a step position for continuing the operation of the regulator in the given direction to complete an operating step of the regulator independently of the primary relay, switch controlled means responsive to the initiation of the operation of the regulator in the one or in the other direction and effective during the operation of the regulator through a regulating step for biasing the primary relay in a direction to cause an interruption in the operation of the regulator upon a completion of an operating step and to promptly interrupt the means for biasing the primary relay upon the completion of an operating step of the regulator, and switching means effective upon the completion of an operating step of the regulator for returning the control of the regulator to the primary relay for initiating further operation of the regulator in response to variations in the regulated condition from normal.

8. In combination, an alternating-current circuit to be regulated, regulating mechanism for adjusting the voltage of said circuit in predetermined operating steps, an electric motor for operating the regulating mechanism, control equipment for said motor including a primary relay responsive to the value of the voltage of said alternating-current circuit for initiating the operation of said motor in the one or in the other direction, electrically controlled switching means independent of the primary relay and effective upon the initiation of the operation of the motor in the one or in the other direction for continuing the operation of the motor to complete an operating step of the regulating mechanism, and electrically operated switch controlled means responsive to and effective during the operation of the regulating mechanism through an operating step for biasing the primary relay in a direction to oppose continued operation of the regulating mechanism in the same direction upon the completion of the operation thereof through a regulating step.

9. In combination, an alternating-current circuit to be regulated, means including a transformer for supplying alternating-current energy to said circuit, tap-changing mechanism for adjusting the voltage supplied to said alternating-current circuit, regulating means for controlling the operation of the tap-changing mechanism through successive tap-changing steps of operation, each step of operation being effective for changing the connection of the alternating-current circuit from one transformer tap connection to another, control equipment for said tap-changing mechanism including a contact making primary relay and a control circuit therefor responsive to the voltage of said alternating-current circuit for initiating the operation of the tap-changing mechanism, electrically controlled means including a cam operated switch responsive to initiating the operation of the tap-changing mechanism for causing a continuation of the operation thereof through an operating step of the mechanism independently of the primary relay, and switch controlled reactance means operatively connected to modify the primary relay control circuit responsive to and effective only during the operation of the tap-changing mechanism through an operating step from one tap position to another for biasing the primary relay in a direction to separate the relay contacts initiating the operation, and switching means effective upon the completion of an operating step of the tap-changing mechanism for returning the control of the tap-changing mechanism to the primary relay.

HERBERT J. CARLIN.
JAMES F. CHAPMAN.

REFERENCES CITED

The following references are of record in the file of this patent:

UNITED STATES PATENTS

| Number | Name | Date |
| --- | --- | --- |
| 1,936,801 | Nycum | Nov. 28, 1933 |
| 2,254,039 | Kovalsky | Aug. 26, 1941 |